(12) United States Patent
Serre et al.

(10) Patent No.: US 10,313,647 B2
(45) Date of Patent: Jun. 4, 2019

(54) METHOD OF TRANSITIONING COLOR TRANSFORMATIONS BETWEEN TWO SUCCESSIVE MAIN SEQUENCES OF A VIDEO CONTENT

(71) Applicant: THOMSON LICENSING, Issy les Moulineaux (FR)

(72) Inventors: Catherine Serre, Saint-Grégoire (FR); Jurgen Stauder, Montreuil/Ille (FR); Sebastien Lasserre, Thorigné Fouillard (FR)

(73) Assignee: InterDigital CE Patent Holdings, Paris (FR)

( * ) Notice: Subject to any disclaimer, the term of this patent is extended or adjusted under 35 U.S.C. 154(b) by 230 days.

(21) Appl. No.: 15/288,405

(22) Filed: Oct. 7, 2016

(65) Prior Publication Data
US 2017/0103544 A1  Apr. 13, 2017

(30) Foreign Application Priority Data
Oct. 8, 2015  (EP) .................................. 15306584

(51) Int. Cl.
*H04N 9/64* (2006.01)
*H04N 1/60* (2006.01)

(52) U.S. Cl.
CPC ..... *H04N 9/64* (2013.01); *G06T 2207/10016* (2013.01); *G06T 2207/10024* (2013.01); *G06T 2207/20008* (2013.01)

(58) Field of Classification Search
CPC .......... H04N 9/64; H04N 9/641; H04N 9/642; H04N 9/643; H04N 9/646; H04N 9/648;
(Continued)

(56) References Cited

U.S. PATENT DOCUMENTS 5,377,041 A   12/1994 Spaulding et al.
5,604,610 A   2/1997 Spaulding et al.
(Continued)

FOREIGN PATENT DOCUMENTS

JP      3673716        7/2005
JP      5450563        3/2014
WO   WO2015131330      9/2015

OTHER PUBLICATIONS

Andrivon et al., "SEI message for Colour Mapping Information", Document JCTVC-Q0074, Joint Collaborative Team on Video Coding (JCT-VC) of ITU-T SG 16 WP 3 and ISO/IEC JTC 1/SC 29/WG 11, 17th Meeting, Valencia, Spain, Mar. 27, 2014, pp. 1-14.
(Continued)

*Primary Examiner* — Dwayne D Bost
*Assistant Examiner* — Stephen M Brinich
(74) *Attorney, Agent, or Firm* — Brian J. Dorini; Patricia A. Verlangieri

(57) ABSTRACT

According to this method, upon reception of a color transform associated with a main sequence, a transition sequence is generated from successive images of this main sequence such that the first image of this transition sequence is an image received after reception of this color transform, transition color transforms associated with images of said transition sequence are generated by blending a color transform associated with a previous main sequence or no color transform with the second color transform, and each image of this transition sequence is processed using the transition color transform associated with said image.

11 Claims, 2 Drawing Sheets

(58) Field of Classification Search
CPC .. H04N 9/67; H04N 9/68; H04N 9/69; H04N 9/73; H04N 9/74; H04N 9/75; H04N 9/76; H04N 19/00; H04N 1/4175
USPC ............ 382/162–167, 276, 302; 358/1.9, 2.1
See application file for complete search history.

(56) References Cited

U.S. PATENT DOCUMENTS

| | | | |
|---|---|---|---|
| 6,222,884 | B1 | 4/2001 | Mitchell et al. |
| 6,532,081 | B1 | 3/2003 | Cecchi et al. |
| 6,720,973 | B2 | 4/2004 | Butler |
| 6,721,064 | B1 | 4/2004 | Huang et al. |
| 6,822,757 | B1 | 11/2004 | Usami et al. |
| 6,850,342 | B2 | 2/2005 | Woolfe et al. |
| 7,003,178 | B2 | 2/2006 | Pettigrew et al. |
| 7,042,464 | B1 | 5/2006 | Paquette |
| 7,342,682 | B2 | 3/2008 | Haikin et al. |
| 7,355,606 | B2 | 4/2008 | Paquette |
| 8,103,096 | B2 | 1/2012 | Bala et al. |
| 2008/0069439 | A1* | 3/2008 | Kwak .................. H04N 1/6052 382/162 |
| 2009/0059080 | A1* | 3/2009 | Chen ....................... H04N 9/73 348/655 |
| 2009/0297026 | A1 | 12/2009 | Abe |
| 2012/0170841 | A1* | 7/2012 | Lee .......................... G06T 15/20 382/166 |
| 2013/0033516 | A1 | 2/2013 | Stauder et al. |

OTHER PUBLICATIONS

Morovic et al., "The Fundamentals of Gamut Mapping: A Survey", Journal of Imaging Science and Technology, vol. 45, No. 3, May/Jun. 2001, pp. 283-290.

Montag et al., "Psychophysical Evaluation of Gamut Mapping Techniques Using Simple Rendered Images and Artificial Gamut Boundaries", IEEE Transaction on Image Processing, vol. 6, No. 7, Jul. 1997, pp. 977-989.

Zolliker et al., "On the Continuity of Gamut Mapping Algorithms", Proceedings of the SPIE Color Imaging X: Processing, Hardcopy, and Applications, vol. 5667, Jan. 17, 2005, pp. 220-233.

Anonymous, "Series H: Audiovisual and Multimedia Systems, Infrastructure of audiovisual services—Coding of moving video, High efficiency video coding", ITU-T Telecommunication Standardization Sector of ITU, H.265, Edition 2.0, Oct. 2014, pp. 1-540.

Kwak et al., "Edge-Enhanced Error Diffusion Halftoning using Human Visual Properties", IEEE International Conference on Hybrid Information Technology, JeJu Island, Korea, Nov. 9, 2006, pp. 1-6.

Anonymous, "Mastering Display Color Volume Metadata Supporting High Luminance and Wide Color Gamut Images", SMPTE Standard, SMPTE ST 2086:2014, Oct. 13, 2014, pp. 1-6.

Lin et al., "Perceptual visual quality metrics: A survey", Journal of Visual Communication and Image Representation, vol. 22, No. 4, May 2011, pp. 1-16.

Saha et al., "Effect of Image Activity on Lossy and Lossless Coding Performance", IEEE Data Compression Conference, Snowbird, Utah, USA, Mar. 28, 2000, pp. 1.

Stauder et al., "A Gamut Boundary Metadata Format", Conference on Colour in Graphics, Imaging and Vision, CGIV 2012, Amsterdam, Netherlands, May 6, 2012, pp. 1-7.

Stauder et al., "Extension of Colour Gamut in Digital Acquisition and Colour Correction", 6th European Conference for Visual Media Production, London, United Kingdom, Nov. 12, 2009; pp. 1-10.

Anonymous, "Multimedia Systems and Equipment—Colour Measurement and Management—Part 12-1: Metadata for Identification of Colour Gamut (Gamut ID)", International Electrotechnical Commission, Document IEC 61966-12-1, Jan. 12, 2011, pp. 1-38.

* cited by examiner

METHOD OF TRANSITIONING COLOR TRANSFORMATIONS BETWEEN TWO SUCCESSIVE MAIN SEQUENCES OF A VIDEO CONTENT

REFERENCE TO RELATED EUROPEAN APPLICATION

This application claims priority from European Application No. 15306584.2, entitled "Method Of Transitioning Color Transformations Between Two Successive Main Sequences of A Video Content," filed on Oct. 8, 2015, the contents of which are hereby incorporated by reference in its entirety.

TECHNICAL FIELD

The invention concerns a method and a system for applying a color transform to video in a temporally gradual way.

BACKGROUND ART

When transmitting images from a server or from an emitter to a receiver, or when storing images on a storage device, it is often useful to transmit and/or store a color transform associated with these images, in order to be able to further transform these images using this associated color transform.

Color transforms are commonly applied to images or parts of these images, whenever color coordinates of their colors need for instance to be adapted to another color encoding standard (colorimetric color management, Electro-Optical Transfer Functions—EOTF, Optic-Electrical Transfer Functions—OETF), and/or to another color gamut (color gamut mapping), and/or to another viewing conditions (color appearance) and/or to another artistic intent (color grading). When applied to colors of an image, a color transform can modify the luminance, the hue and/or the saturation of these colors, the contrast and/or the white balance, the black level and/or the white level, or other aspects of this image. A color transform can be a Color Look Up Table (CLUT), a splines-based model, a Gain-Offset-Gamma (GOG) model or any other parametric model.

Color gamut mapping is notably used for rendering images on image display devices, notably when the color gamut of a content to display (source color gamut) is different from the color gamut of the display device (target color gamut) used for the rendering. As the target color gamut is generally specific to each type of display device, it is common to transmit an adapted color transform to a receiving equipment connected to the display device (or integrated to it) together with the content to display, in order to allow this receiving equipment to apply this adapted color transform to the received content before sending it to the display device for rendering. Such receiving equipment can be for instance a gateway or a set-top-box. This receiving equipment can also be part of a TV set, of a tablet or of a cell phone. When the source color gamut changes from a sequence of this content to another sequence of the same content to display, a specific adapted color transform should generally be applied to images of each sequence of this content: in such a situation in which a video content to display is divided in a plurality of main sequences of consecutive images, a color transform associated with each main sequence is transmitted to the receiving equipment together with the images of this main sequence. Such main sequences can correspond for instance to different scenes of a content, for instance an outdoor scene following an indoor scene, or to different parts of a content, for instance an advertisement following a sequence of a movie.

A similar situation may occur when images are exchanged between different post-production facilities: each image or sequence of images is exchanged with its specific color transform allowing rendering the same colors such as to let all image producers perceive the same colors whatever are their viewing conditions and/or their color perceptions.

When a content is transmitted to a receiving equipment and/or stored on a storing device, color transforms associated with this content need also to be transmitted and/or stored. That is why besides color data describing each image of the content (RGB data together with pixel position data of this image), i.e. besides content data, color metadata defining these associated color transform need also to be transmitted and/or stored.

There are generally two kinds of such color metadata: descriptive metadata and mapping metadata. These metadata are advantageously standardized as follows.

Descriptive metadata are for instance adapted to describe the color gamut of an image, of a sequence of images or of a content. See for instance IEC 61966-12-1, Multimedia systems and equipment—Colour measurement and management—Part 12: Metadata for identification of colour gamut (Gamut ID). When associated with a video content, such color gamut metadata define the color gamut for which this content was created. The gamut ID metadata identify for instance a set of 3D indexed faces building a gamut boundary description which is organized into three levels. Other descriptive metadata may provide information on the color primaries and on the dynamic range of the display device that was used to generate or to master images of a content. See for instance SMPTE ST2086.

Mapping metadata comprises notably data describing color mapping, color transform or change of color data to be applied to colors of images. To define a color transform, such metadata comprise for instance a set of six 1D Look Up Tables and one 3×3 linear Matrix. See for instance MPEG SEI message Color Remapping Information (CRI) in ITU-T Recommendation H.265|International Standard ISO/IEC 23008-2, "High Efficiency Video Codec", Edition 2.0, October 2014.

Content data related to colors to render and metadata related to color transform to apply to these colors before rendering can be transmitted to a receiving equipment over different channels and these channels may not be synchronized. For example, metadata related to an image may be received earlier or later than content data which these metadata are associated with.

The application of a color transform associated with a main sequence of images to images of this main sequence generally generates a change in the colors of these images. In the process of rendering images of different consecutive main sequences that are transformed using a color transform associated with the main sequence to which these images belongs, the change of color look generated by the change of color transform from one main sequence to another one will not be generally perceived by a viewer when these two sequences correspond to different contexts and when the change of color transform is perfectly synchronized with the change of sequence. Different contexts mean for instance different scenes of the content, one being for instance indoor and the other one being then outdoor, or different parts of the content, one part belonging to a movie and another part being an advertisement. Even if the change of color look between two different consecutive main sequences due to the change of color transform is perceived by a viewer, this effect is usually desired since the color data and the color transform metadata are generally created with a specific artistic intent. Generally, the change of color transform is temporally aligned to the change of main sequence.

A problem arises when the change of color transform is not synchronized with the change of sequence. It may happen for instance when metadata defining a second color transform associated with a second sequence is received too late to be able to apply this second color transform to the first images of this second sequence before rendering them.

Such a problem notably arises when:

metadata defining the second color transform are transmitted after the beginning of the rendering of the second sequence;

processing of these metadata in order to get this second transform takes a long time before being ready to be applied to first images of the second sequence;

processing first images of the second sequence using this second color transform takes too much time before sending the corresponding transformed images to the display device for rendering.

When the change of color transform is not synchronized with the change of sequence from a first one to a second one, the change of color transform will occur during the ongoing display of the second sequence and may then be perceived by a viewer as an artefact.

An aim of the invention is to limit such visual artefacts during the rendering of video content divided in different sequences of images having each their specific color transform.

In order to solve this problem, it is proposed to build a transition sequence, notably from images of the beginning of the second sequence, and to change progressively the color transform applied to images of this transition sequence, notably from the first color transform associated with the first sequence to the second color transform associated with the second sequence. U.S. Pat. Nos. 7,355,606 and 7,042,464 disclose using fade transition effects to transit from one scene (or sequence) to another, in order to provide a smooth transition between these two scenes, and to avoid abrupt scene changes. In an embodiment, these documents disclose a method to adjust a gamma look up table to generate such transition effects: a special gamma look up table is applied to each image during the transition, which is calculated according to a blending between a usual gamma look up table and a target color, wherein the blending factor is a function of the elapsed time from the beginning of the transition effect.

SUMMARY OF INVENTION

It is an object of the invention to further improve the transition between the processing of images of a first main sequence using a first color transform and the processing of images of a second main sequence using a second color transform, notably when the second color transform is not yet available at the time of processing the first images of the second main sequence.

For this purpose, a subject of the invention is a method of receiving and processing images of a video content divided in at least two successive main sequences of successive images, comprising:

receiving images of a first main sequence and receiving a first color transform associated with said first main sequence, processing images of said first main sequence using said received first color transform, receiving images of a second main sequence and receiving a second color transform associated with said second main sequence, upon or after reception of said second color transform, processing each image of a transition sequence using a transition color transform associated with said image, wherein said transition sequence is composed of successive images of the second main sequence and wherein the first image of said transition sequence is an image received after reception of said second color transform, wherein transition color transforms associated with images of said transition sequence are generated by blending the first color transform or no color transform with the second color transform, wherein such a blending is computed with an increasing weight allocated to the second color transform over images of said transition sequence, and with a decreasing weight allocated to the first color transform or no color transform over images of said transition sequence, processing received images of said second main sequence that follows the last image of said transition sequence using said second color transform.

In summary, according to this method, upon reception of a color transform associated with a main sequence, a transition sequence is generated from successive images of this main sequence such that the first image of this transition sequence is an image received after reception of this color transform, transition color transforms associated with images of said transition sequence are generated by blending a color transform associated with a previous main sequence or no color transform with the second color transform, and each image of this transition sequence is processed using the transition color transform associated with said image.

Preferably, said processing images of said first main sequence is performed upon reception of the first color transform.

Preferably, this method comprise processing successively first received images of said second main sequence using said first color transform, at least until said second color transform is received. Alternatively, these first received images are not transformed at all.

Images of the second main sequence and the second color transform are generally received after reception of last images of the first main sequence.

The processing of images of the first main sequence by using said received first color transform may be delayed after reception of this first color transform. It means that some images received just after reception of this first color transform may be processed differently.

Preferably, the number of images composing said transition sequence depends on the content of images received before reception of said second color transform, and/or depends on the number of images between the first image of the second main sequence and the first image of said transition sequence, and/or depends on a difference between the first color transform and the second color transform.

According to a first variant, the number of images composing said transition sequence is inversely proportional to a value indicative of spatio-temporal activity of images received before reception of said second color transform and/or included in said transition sequence. The spatio-temporal activity of such images can for instance be evaluated using the standard deviation of differences of luminances of colors within these images.

The transition between two successive main sequences will then be accelerated and will then be sharper when there is a high activity in images preceding or included in the transition sequence, as the transition is little perceptible to a viewer in these conditions. Reversely, the transition between two successive main sequences will be slowed down will and then be smoother when there is a low activity in images preceding or included in the transition sequence, as the transition is more perceptible to a viewer in these conditions.

According to a second variant, the number of images composing said transition sequence depend on the number of images between the first image of the second main sequence and the first image of said transition sequence.

Such a number of images is representative of the time interval between the reception of the first image of the second main sequence and the reception of the color transform associated with this second main sequence. Then, according to this variant, different strategies can be applied to determine the duration of the transition between the application of the color transform associated with the first main sequence and the application of the color transform associated with the second main sequence. For example, in a case where expert viewers are watching the received images for professional reasons, one might decide that this duration is the shorter the longer is the time interval. By this strategy, the images have quicker the right color and artefacts due to a shorter duration might be acceptable for professional viewers. In another example, when non-expert viewers are watching the received images, the highest priority could be to avoid artefacts induced by a too short duration of the transition after a too long time interval. In this case, the duration might be proportional to the time interval.

According to a third variant, the number of images composing said transition sequence is proportional to a value representative of the difference between the first color transform associated with the first main sequence and the second color transform associated with the second main sequence.

Advantageously, large color difference between color transforms implies long transition sequence between the main sequences with which these color transforms are associated and, reversely, small color difference between color transforms implies short transition sequence between the main sequences with which these color transforms are associated.

Various possibilities exist to compute a value representative of the difference between two color transforms. For example in the case of two color transforms represented by color look-up tables, the mean squared difference between the values of these two look-up tables represents such a difference. In case of color transforms represented by a parametric function, the difference between the value of the parameters of the two parametric functions represents such a difference. Another possibility is to define a set of test colors, to transform them using a first color transform resulting in first transformed test colors and transforming the test colors by the second color transform resulting in second transformed test colors, and then representing such a difference by evaluating the mean squared difference between the first and second transformed test colors.

A subject of the invention is also a video receiving and processing device comprising:

a receiver configured for receiving images of a video content divided in at least two successive main sequences of successive images, namely a first main sequence and a second main sequence, and configured for receiving a first color transform associated with said first main sequence and a second color transform associated with said second main sequence, a sequence composer configured for composing a transition sequence by successive images of the second main sequence, using an image received after reception of said second color transform as the first image of said transition sequence, a color transform generator configured for generating transition color transforms associated with images of a transition sequence composed by said sequence composer, by blending the first color transform or no color transform with the second color transform, wherein this blending is computed with an increasing weight allocated to the second color transform over images of said transition sequence, and with a decreasing weight allocated to the first color transform or no color transform over images of said transition sequence, a color processor configured for processing images of said first main sequence using said first color transform upon reception of this first color transform by said receiver, processing successively first images of said second main sequence using said first color transform at least until said second color transform is received by said receiver, processing each image of a transition sequence composed by said sequence composer using a transition color transform associated with said image which is generated by said color transform generator, and processing images of said second main sequence that follows the last image of said transition sequence using said second color transform.

Preferably, said sequence composer is also configured for allocating, for the composition of a transition sequence, a number of images in dependence on the content of images received before the first image of said transition sequence, and/or in dependence on the number of images between the first image of the second main sequence and the first image of said transition sequence, and/or in dependence on a difference between the first color transform and the second color transform.

According to a first variant, said sequence composer is also configured for allocating, for the composition of a transition sequence, a number of images which is inversely proportional to a value indicative of spatio-temporal activity of images preceding said transition sequence and/or included in said transition sequence.

According to a second variant, said sequence composer is also configured for allocating, for the composition of a transition sequence, a number of images depending on the number of images between the first image of the second main sequence and the first image of said transition sequence.

According to a third variant, said sequence composer is also configured for allocating, for the composition of a transition sequence, a number of images which is proportional to a value representative of the difference between the first color transform and the second color transform.

BRIEF DESCRIPTION OF DRAWINGS

The invention will be more clearly understood on reading the description which follows, given by way of non-limiting example and with reference to the appended figures in which.

DESCRIPTION OF EMBODIMENTS

It is to be understood that the invention may be implemented in various forms of hardware, software, firmware, special purpose processors, or combinations thereof. The invention may be notably implemented as a combination of hardware and software. The hardware may notably correspond to a video receiving and processing device 1, as, for instance, a set-top-box, a gateway, a TV set, a tablet or a smart phone. The software may be implemented as an application program tangibly embodied in a program storage unit included in the device. The application program may be uploaded to, and executed by, a machine included in the video receiving and processing device comprising any suitable architecture. Preferably, the machine is implemented in the video receiving and processing device having hardware such as one or more central processing units ("CPU"), a random access memory ("RAM"), and input/output ("I/O") interfaces. The video receiving and processing device may also include an operating system and microinstruction code. The various processes and functions described herein may be either part of the microinstruction code or part of the application program, or any combination thereof, which may be executed by a CPU. In addition, a display unit 2 is connected to the video receiving and processing device, or is part of this device. Other various peripheral units may be connected to the video receiving and processing device such as an additional data storage unit.

In all embodiments described below, a video content is received by this video receiving and processing device. After being processed by this device, the processed video content is sent to the display unit to be reproduced.

This video content is divided in different scenes, parts, or shots, requiring different kinds of color transformation. Each scene or part or shot then forms a main sequence of successive images associated with a specific color transform.

Figure 1:
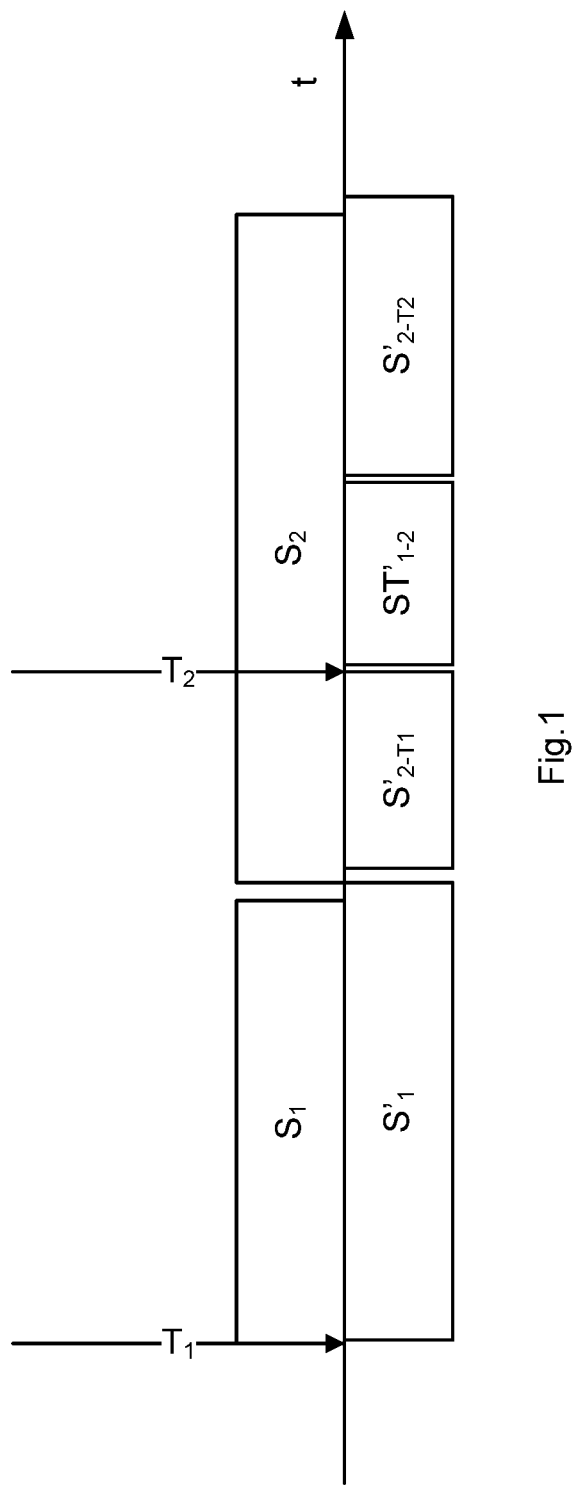
FIG. 1 illustrates an embodiment of processing along time of different sequences of a video content over time, according to the invention.

A first embodiment of the method of receiving and processing images of this video content will now be described in reference to FIG. 1.

The video receiving and processing unit receives successively each image of a first main sequence $S_1$ of this content, processes this image into a first transformed sequence $S'_1$ by using a first color transform $T_1$ associated with this first main sequence $S_1$, and sends the resulting transformed image to the display unit 2 for rendering.

In this implementation, the video receiving and processing device signals the index of an "initial" image that is temporally the first image where the first color transform is to be applied. This first image is called initial image. For example, this image can be the first image of a first main sequence and the creator of the content has decided not to apply any color transform before the initial image and to apply the first color transform to all images of the first main sequence from the initial image on. It means that the transformation of images of the first main sequence $S_1$ starts upon reception of this first color transform $T_1$.

After reception of the last images of the first main sequence $S_1$, the video receiving and processing unit receives successively each image of a second main sequence $S_1$ of the content, which follows the first main sequence $S_1$. As far as the second color transform $T_2$ associated with this second main sequence is not received and/or not available to be applied to an image which has just been received, an alarm flag A is set. Reasons for such a delay of reception include slow reception. Reasons for such a delay of availability includes slow processing of the color transform and/or slow application of the received color transform to images. All images of the second sequence that are received before the reception of the second color transform $T_2$ form a first intermediate sequence. As soon as the second color transform $T_2$ is received and available to be applied to an image, the alarm flag A is unset and the intermediate sequence is ended.

As soon as they are received, images of the first intermediate sequence are processed into a first part of a second transformed sequence $S'_{2\text{-}T1}$ using the first color transform $T_1$ and these processes images are sent to the display unit. For cases where the first color transform $T_1$ is not appropriate for these images of the second main sequence $S_1$, another option is no transformation at all of the colors of these images, i.e. for instance to use a "unity transform" (a transform that does not change color) for these images, instead of the first color transform $T_1$.

During this period in which the alarm flag is set, i.e. during the intermediate sequence, an adapted plug-in software analyzes the received images of the second main sequence such as to output a value $s_{1\text{-}2}$ representative of a spatio-temporal activity of these images.

The plug-in software is for instance adapted to evaluate the spatio-temporal activity of a group of images for instance by calculation of the standard deviation $s_{1\text{-}2}$ of differences of luminances of colors within images of this group. Here, such a group corresponds to the intermediate sequence.

Known methods for the calculation of spatio-temporal activity of an image or images of a group can be used. For example, Kwak et al. propose in their paper entitled "Edge-Enhanced Error Diffusion Halftoning using Human Visual Properties" published in Volume 1 of the Proceedings of the International Conference on Hybrid Information Technology (ICHOT) in 2006 to compute a local, spatial activity measure, which is the difference, within a given image, between a pixel luminance and the average of its neighborhood pixels within a 3×3 pixel window. Other activity measures are based on image variance, edges, wavelet coefficients and gradients such as discussed by Saha et al. in their paper entitled "Effect of image activity on lossy and lossless coding performance" published in Proceedings of the Data Compression Conference (DCC) in 2000. Still another possibility is to measure motion between succeeding images of a group and use the amount of motion as activity measure such as proposed by Lin et al. in their paper entitled "Perceptual visual quality metrics: A survey" published in the Journal of Visual Communication in 2011.

As soon as the second color transform $T_2$ is received, the alarm flag A is unset and the first intermediate sequence is finished. Then, starting with the first received image of the main sequence $S_1$ which is received but not yet processed, a number $M_{1\text{-}2}$ of images following this received image is allocated to a first transition sequence $ST_{1\text{-}2}$. This transition sequence is for instance composed by a sequence composer. The number $M_{1\text{-}2}$ of images composing this transition sequence $ST_{1\text{-}2}$ is for instance calculated as follows from the standard deviation $s_{1\text{-}2}$ of differences of luminances of colors over at least two out of the previous images of the second main sequence:

$$M_{1\text{-}2} = 25 \max(1; \min(8; 50/s_{1\text{-}2}))$$

assuming that luminance values of colors are encoded between 0 and 255 (meaning that $s_{1-2}=50$ corresponds to a rather large spatio-temporal image activity) and assuming an image rate of 50 frames per second (meaning that $M_{1-2}=25$ corresponds to a short duration of a half second and $M_{1-2}=8*25=200$ corresponds to a long duration of 4 seconds).

The value that is obtained for this standard deviation $s_{1-2}$ is indicative of a spatio-temporal activity of images preceding the transition sequence $ST_{1-2}$ and, according to the calculation of $M_{1-2}$ above, the number of images composing this transition sequence that is obtained is then inversely proportional to this value.

Preferably, for computing this spatio-temporal activity, all images of the first intermediate sequence are considered.

According to this composition of the transition sequence, the transition sequence will last shorter in situations of high spatio-temporal activity in the previous images and will last longer in situations of low spatio-temporal activity in the previous images. Then, in this example, the change of color transform during the transition sequence is masked advantageously by the spatio-temporal activity of images received just before this transition sequence. If images corresponding to the period after the intermediate sequence are available, for example thanks to a buffered process, these images can be also used in order to measure the spatial-temporal activity $s_{1-2}$.

Then, using for instance a color transform generator, for each $m=1, \ldots, m, \ldots, M_{1-2}$ of the $M_{1-2}$ images of the transition sequence $ST_{1-2}$, a transition color transform $T_{1-2,m}$ is calculated such as to distribute the change of color transform over these images from the first color transform $T_1$ to the second color transform $T_2$. It means that these transition color transforms change progressively over the $M_{1-2}$ images from the first color transform $T_1$ or from no color transform towards the second color transform $T_2$. Preferably, the distribution of changes of transition color transform from one image to a next one of the transition sequence is preferably homogenous over images of this sequence. Accordingly, each color transform $T_{1-2,m}$ can be for instance calculated as follows:

$$T_{1-2,m}=[T_1 \cdot (M_{1-2}-m)+T_2 \cdot (m-1)]/(M_{1-2}-1) \qquad (1)$$

It means that transition color transforms are generated by blending the first color transform $T_1$ with the second color transform, such a blending being computed with an increasing weight $(m-1)/(M_{1-2}-1)$ allocated to the second color transform over the numbering order m of image in the transition sequence $ST_{1-2}$, and with a decreasing weight $(M_{1-2}-m)/(M_{1-2}-1)$ allocated to the first color transform over the numbering order m of image in the transition sequence $ST_{1-2}$.

Then each m of the $M_{1-2}$ images of the transition sequence $ST_{1-2}$ is processed using its associated color transform $T_{1-2,m}$ such as to obtain a transformed transition sequence $ST'_{1-2}$ which is then sent to the display unit 2.

The transition color transform $T_{1-2,m}$ applied to each image of the transition sequence is then a weighted blend of the first color transform and of the second color transform, with a weight given to the first color transform decreasing progressively from one image to a following one of the transition sequence, and reversely with a weight given to the second color transform increasing progressively from one image to a following one of the transition sequence.

As a variant, the first image of the transition sequence is not color transformed at all, and then, the second color transform is progressively applied with an increasing weight to the other images of the transition sequence. In other words, the processing of images of this transition sequence is progressively changed from no color transform towards the second color transform, such that the weight given to the second color transform in the transition color transform $T'_{1-2,m}$ applied to each image of the transition sequence increases progressively from one image to a following one of the transition sequence. This corresponds to Equation (1) above with $T_1$ replaced by a unity transform U. By definition, a unity transform does not change a color when it is applied to a color. In this variant, we have then:

$$T'_{1-2,m}=[U(M_{1-2}-m)+T_2 \cdot (m-1)]/(M_{1-2}-1)$$

It means that transition color transforms are generated by blending a unity color transform U with the second color transform, such a blending being computed with an increasing weight $(m-1)/(M_{1-2}-1)$ allocated to the second color transform over the numbering order m of image in the transition sequence $ST_{1-2}$, and with a decreasing weight $(M_{1-2}-m)/(M_{1-2}-1)$ allocated to no color transform (i.e. color transform=U) over the numbering order m of image in the transition sequence $ST_{1-2}$.

After completion of the processing of all images of the transition sequence, each of the following images of the second main sequence $S_1$ are transformed successively into a second part of the second transformed sequence $S'_{2-T2}$ using the second color transform $T_2$, and then sent successively to the display unit 2.

After reception of the last images of the second main sequence $S_2$, in this non limiting embodiment, the video receiving and processing unit receives successively each image of a third main sequence $S_3$ of the content, which follows the second main sequence $S_2$. As far as the third color transform $T_3$ associated with this third main sequence is not received and/or not available to be applied to an image, the alarm flag A is set and a second intermediate sequence is initiated that included images as soon as they are received. When the third color transform $T_3$ is received and available to be applied to an image, the alarm flag A is unset again and the second intermediate sequence is ended.

While the alarm flag A is set, images of the second intermediate sequence are processed using the second color transform $T_2$ (or no color transform according to the same variant as above) and are sent to the display unit after being processed. During this period in which the alarm flag is set, the adapted plug-in software analyzes the received images of the third main sequence such as to output a value $s_{2-3}$ representative of a spatio-temporal activity of these images, which is calculated as described above.

As soon as the alarm flag A is again unset and the second intermediate sequences is ended, starting with the first received image which is not yet processed, a number $M_{2-3}$ of images following this received image is allocated to a second transition sequence $ST_{2-3}$. The number $M_{2-3}$ of images composing this transition sequence is calculated as described above from a standard deviation $s_{2-3}$ calculated as described above over images of the second intermediate sequence.

Then, using the same color transform generator, for each $m'=1, \ldots, m', \ldots, M_{2-3}$ of the $M_{2-3}$ images of the transition sequence $ST_{2-3}$, a transition color transform $T_{2-3,m'}$ is calculated such as to distribute as described above the change of color transform from the second color transform—or no color transform at all as the variant above—up to the third color transform.

Then each m' of the $M_{2\text{-}3}$ images of the transition sequence $ST_{2\text{-}3}$ is processed using its associated color transform $T_{2\text{-}3,m'}$ and then sent to the display unit.

After completion of the processing of all images of the transition sequence $ST_{2\text{-}3}$, each of the following images of the third main sequence $S_3$ are transformed successively using the third color transform $T_3$, and then sent successively to the display unit.

The process above is repeated for each successive main sequence of the video content to display on the display unit. In the different transition sequences composed as described above, the processing of images is progressively changed from a color transform associated with the main sequence of images preceding this transition sequence—or no color transform at all as a variant—towards a color transform associated with the main sequence of images following this transition sequence. The number of images composing these different transition sequences generally varies over these different transition sequences, as it depends, in this embodiment, on the content of images, more precisely on a value representative of the spatio-temporal activity of images preceding the transition sequence to consider. An advantage of this embodiment is that the change of color transform is masked by the spatio-temporal activity of images positioned right before the period of transition. Another advantage is that too fast color transform changes are avoided that would have been annoying for a viewer when the spatio-temporal activity is low.

Instead of using a value representative of the spatio-temporal activity of images to evaluate the content of images, any other way of evaluating the content can be used. It means more generally that the composition of each transition sequence depends on the content of images received before the first image of this transition sequence.

A second embodiment of the method of receiving and processing images of this video content will now be described. This embodiment is the same as the first embodiment except the following features.

In this embodiment, an image counter counts the number of images in each intermediate sequence. It means that, during each period preceding a transition sequence in which the alarm flag A is set, the image counter counts the number of images which are sent to the display unit after being processed. Then, the number of images allocated for the composition of the transition sequence is proportional to the number of images which have been counted. In this way, when the delay between the reception of the first images of a new main sequence and the reception of a new color transform associated with this main sequence is large, a larger number of images is used for the transition towards the second color transform, and reversibly, thus smoothing transitions between color transforms in dependency of the delay of reception of the second color transform and thus keeping the transitions from a color transform to another one little noticeable to a viewer.

In this second embodiment, it is possible not to take into account the activity of images as in the first embodiment. In such a situation, the plug-in software is not part of the device and the number of images in each transition sequence depends only on the number of images in the intermediate sequence preceding this transition sequence, i.e. on the number of image between the first image of a main sequence the reception of which is under process and the image which is received or going to be processed when the color transform associated with this main sequence is received.

A variant of this second embodiment will now be described. In this variant, the number of images of a main sequence that remains at the moment of reception of the color transform associated with this main sequence and that are not yet processed by this color transform is taken into account additionally to determine the number of images of this main sequence to allocate for the composition of the transition sequence. Processing including the "unity" transform according to the variant above. An advantage of this variant is to prevent from too many and too strong changes of color transform during the display of the content. In this variant, the color transform associated with this main sequence is only applied partially.

As described above, the image counter counts the number of images in the intermediate sequence. It means that, while the alarm flag A is set, the image counter counts the number of images which are sent to the display unit after being processed resulting in a first image number $I_1$.

Then, according to this variant, the image counter counts also the number of remaining images in the main sequence resulting in a second image number $I_2$. It means that, if the number of images in the main sequence is $I_S$, we have $I_2 = I_S - I_1$. The remaining images are the images of a main sequence that are sent while the alarm flag is unset.

The number M of images in the transition sequence is then determined such that it is proportional to the first image number $I_1$ and proportional to the second image number $I_2$. For example, we have: $M = k_1 I_1 + k_2 I_2$, where typical values are $k_1 = 0.2$ and $k_2 = 0.1$ as soon as the condition $M < I_2$ is satisfied. Another possibly is to consider specifically the difference between the second image number $I_2$ and the number M of images in the transition sequence according to:

$$M = k'_1 I_1 + k'_2 (I_2 - M) \Rightarrow \frac{1}{1 + k'_2} (k'_1 I_1 + k'_2 I_2)$$

where typical values are $k'_1 = k'_2 = 0.1$ as soon as the condition $2M < I_2$ is satisfied. Note that this case is already included in above equation using two image numbers when setting $$k_1 = \frac{1}{1 + k'_2} k'_1 \text{ and } k_2 = \frac{k'_2}{1 + k'_2}$$

An advantage of this variant is that the number of images of a main sequence used to compose a transition sequence can be adapted to the number of images of this main sequence and not only to the number of images of the intermediate sequence. For example, if the main sequence is short in comparison with the intermediate sequence, the fact that only few images are remaining in the main sequence is considered to define the transition sequence.

A third embodiment of the method of receiving and processing images of this video content will now be described. This embodiment is the same as the first embodiment except the following features.

In this embodiment, instead of evaluating the spatio-temporal activity of images preceding each transition sequence to determine the number of images composing this transition sequence, a difference is evaluated between the color transform associated with the main sequence preceding this transition sequence and the color transform associated with the main sequence following this transition sequence and the number of images allocated for the composition of the transition sequence is proportional to a value representative of this difference. In this way, when the change of color transform represents large color differences, this change is applied slowly over a longer transition sequence and will then not lead to visible artifacts. On the opposite, when the change of color transform represents small color changes, this change is then applied faster over a shorter transition sequence, without risk of artefacts.

A non-limiting example of computing a value representative of this difference between these two color transforms is now described, in which each color transform is represented by a look up table. The value which is considered here as representative of this difference is the mean squared difference between the input-output values of the two lookup tables.

Figure 2:
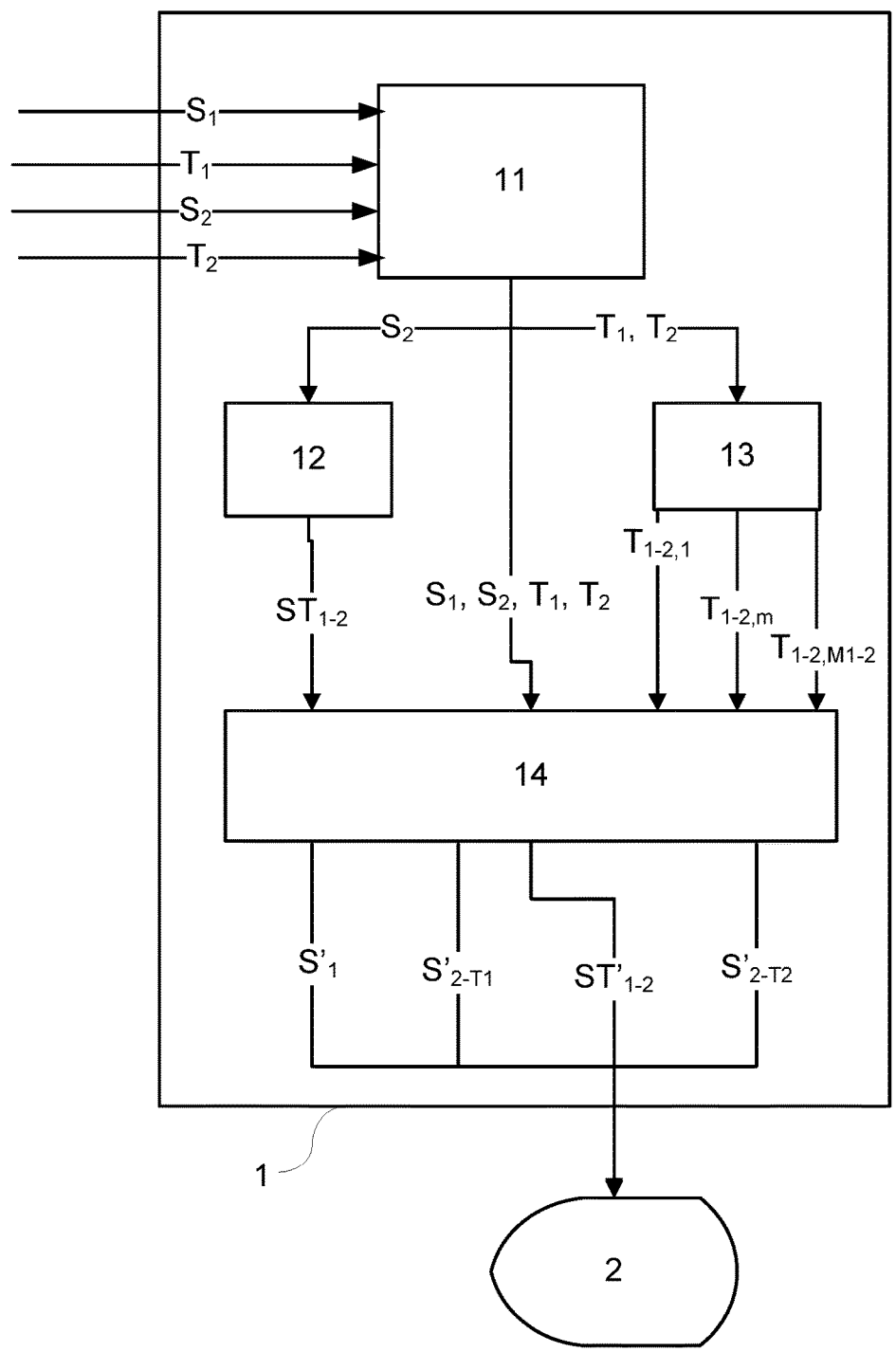
FIG. 2 illustrates an embodiment of a video receiving and processing device adapted to implement the method illustrated on FIG. 1.

According to another hardware aspect of the embodiments above, the video receiving and processing device 1 comprises, in reference to FIG. 2:

a receiver 11 configured for receiving images of different main sequences of successive images, namely a first main sequence and a second main sequence, and configured for receiving a first color transform associated with the first main sequence and a second color transform associated with the second main sequence, and at least one processor configured for:

composing 12 a transition sequence by successive images of the second main sequence, using an image received after reception of the second color transform as the first image of this transition sequence, generating 13 transition color transforms associated with images of a transition sequence composed by said sequence composer, by blending the first color transform or no color transform with the second color transform, wherein this blending is computed with an increasing weight allocated to the second color transform over images of said transition sequence, and with a decreasing weight allocated to the first color transform or no color transform over images of said transition sequence, processing 14 images of said first main sequence using said first color transform upon reception of this first color transform by said receiver, processing successively first images of said second main sequence using said first color transform at least until said second color transform is received by said receiver, processing each image of a transition sequence composed by said sequence composer using a transition color transform associated with said image, and processing images of said second main sequence that follows the last image of said transition sequence using said second color transform.

In order to implement the first embodiment above, the at least one processor is also configured for allocating, for the composition of a transition sequence, a number of images in dependence on the content of images received before the first image of this transition sequence. As a non-limitative embodiment, this number of images may notably be inversely proportional to a value indicative of spatio-temporal activity of images preceding the transition sequence and/or included in this transition sequence.

In order to implement the second embodiment above, the at least one processor is also configured for allocating, for the composition of a transition sequence, a number of images in dependence on the number of images between the first image of the second main sequence and the first image of said transition sequence.

In order to implement the third embodiment above, the at least one processor is also configured for allocating, for the composition of a transition sequence, a number of images in dependence on a difference between the first color transform and the second color transform.

These different components of the video receiving and processing device are functional units that may or may not correspond to physically distinguishable units. For example, these components or some of them can be grouped together in a single component, circuit, and/or in one or a plurality of processor, or constitute functions of the same software. On the contrary, some components may be composed of separate physical entities, as, for instance, a sequence composer, a color transform generator and a color processor. The device can be implemented according to a purely hardware embodiment, for example in the form of a dedicated component (for example in an ASIC (application specific integrated circuit) or FPGA (field-programmable gate array) or VLSI (very large scale integration) or of several electronic components integrated into a device or even in the form of a mixture of hardware elements and software elements.

Although the illustrative embodiments of the invention have been described herein with reference to the accompanying drawings, it is to be understood that the present invention is not limited to those precise embodiments, and that various changes and modifications may be effected therein by one of ordinary skill in the pertinent art without departing from the invention. All such changes and modifications are intended to be included within the scope of the present invention as set forth in the appended claims. The present invention as claimed therefore includes variations from the particular examples and preferred embodiments described herein, as will be apparent to one of skill in the art.

While some of the specific embodiments may be described and claimed separately, it is understood that the various features of embodiments described and claimed herein may be used in combination. Reference numerals appearing in the claims are by way of illustration only and shall have no limiting effect on the scope of the claims.

The invention claimed is:

1. Method of receiving and processing images of a video content divided in at least two successive main sequences of successive images, comprising:

receiving, at a video processor, images of a first main sequence and receiving a first color transform associated with said first main sequence, processing, at the video processor, images of said first main sequence using said received first color transform, providing the processed images of the first main sequence for rendering on a display;

receiving, at the video processor, images of a second main sequence and receiving a second color transform associated with said second main sequence, after reception of said second color transform, processing, by the video processor, each image of a transition sequence using a transition color transform associated with said image, wherein said transition sequence is composed of successive images of the second main sequence and wherein the first image of said transition sequence is an image received after reception of said second color transform, wherein transition color transforms associated with images of said transition sequence are generated by blending the first color transform or no color transform with the second color transform, wherein such a blending is computed with an increasing weight allocated to the second color transform over images of said transition sequence, and with a decreasing weight allocated to the first color transform or no color transform over images of said transition sequence causing a progressive color transform change of the images of the transition sequence from the first color transform or no color transform towards the second color transform, processing received images of said second main sequence that follows the last image of said transition sequence using said second color transform, and providing the processed images of the second main sequence for rendering on a display.

2. Method of receiving and processing images according to claim 1 comprising:

processing successively first received images of said second main sequence using said first color transform, at least until said second color transform is received.

3. Method of receiving and processing images according to claim 1, wherein the number of images composing said transition sequence depends on the content of images received before reception of said second color transform, and/or depends on the number of images between the first image of the second main sequence and the first image of said transition sequence, and/or depends on a difference between the first color transform and the second color transform.

4. Method of receiving and processing according to claim 1 wherein the number of images composing said transition sequence is inversely proportional to a value indicative of spatio-temporal activity of images received before reception of said second color transform and/or included in said transition sequence.

5. Method of receiving and processing according to claim 1 wherein the number of images composing said transition sequence depend on the number of images between the first image of the second main sequence and the first image of said transition sequence.

6. Method of receiving and processing according to claim 1 wherein the number of images composing said transition sequence is proportional to a value representative of the difference between the first color transform associated with the first main sequence and the second color transform associated with the second main sequence.

7. Video receiving and processing device comprising:

a receiver configured for receiving images of a video content divided in at least two successive main sequences of successive images, namely a first main sequence and a second main sequence, and configured for receiving a first color transform associated with said first main sequence and a second color transform associated with said second main sequence, and at least one processor configured for:

composing a transition sequence by successive images of the second main sequence, using an image received after reception of said second color transform as the first image of said transition sequence, generating transition color transforms associated with images of a transition sequence composed by said sequence composer, by blending the first color transform or no color transform with the second color transform, wherein this blending is computed with an increasing weight allocated to the second color transform over images of said transition sequence, and with a decreasing weight allocated to the first color transform or no color transform over images of said transition sequence causing a progressive color transform changeover the images of the transition sequence from the first color transform or no color transform towards the second color transform, processing images of said first main sequence using said first color transform upon reception of this first color transform by said receiver, processing each image of a transition sequence composed by said sequence composer using a transition color transform associated with said image which is generated by said color transform generator, and processing images of said second main sequence that follows the last image of said transition sequence using said second color transform, and providing the processed images of the first main sequence, the transition sequence and the second main sequence for rendering on a display.

8. Video receiving and processing device according to claim 7, wherein said at least one processor is also configured for allocating, for the composition of a transition sequence, a number of images in dependence on the content of images received before the first image of said transition sequence, and/or in dependence on the number of images between the first image of the second main sequence and the first image of said transition sequence, and/or in dependence on a difference between the first color transform and the second color transform.

9. Video receiving and processing device according to claim 7, wherein said at least one processor is also configured for allocating, for the composition of a transition sequence, a number of images which is inversely proportional to a value indicative of spatio-temporal activity of images preceding said transition sequence and/or included in said transition sequence.

10. Video receiving and processing device according to claim 7, wherein said at least one processor is also configured for allocating, for the composition of a transition sequence, a number of images depending on the number of images between the first image of the second main sequence and the first image of said transition sequence.

11. Video receiving and processing device according to claim 7, wherein said at least one processor is also configured for allocating, for the composition of a transition sequence, a number of images which is proportional to a value representative of the difference between the first color transform and the second color transform.

* * * * *